US011095234B2

(12) United States Patent
Wu et al.

(10) Patent No.: US 11,095,234 B2
(45) Date of Patent: Aug. 17, 2021

(54) TRIBOELECTRIC NANOGENERATORS

(71) Applicant: Purdue Research Foundation, West Lafayette, IN (US)

(72) Inventors: Wenzhuo Wu, West Lafayette, IN (US); Shengjie Gao, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 105 days.

(21) Appl. No.: 16/594,126

(22) Filed: Oct. 7, 2019

(65) Prior Publication Data

US 2020/0169188 A1 May 28, 2020

Related U.S. Application Data

(60) Provisional application No. 62/771,190, filed on Nov. 26, 2018.

(51) Int. Cl.
*H02N 1/04* (2006.01)
*C22C 28/00* (2006.01)

(52) U.S. Cl.
CPC ............... *H02N 1/04* (2013.01); *C22C 28/00* (2013.01)

(58) Field of Classification Search
CPC .................................. H02N 1/04; C22C 28/00
See application file for complete search history.

(56) References Cited

U.S. PATENT DOCUMENTS

| 8,803,406 | B2 * | 8/2014 | Lee | ........................ | H01L 41/37 |
| | | | | | 310/339 |
| 9,406,864 | B2 | 8/2016 | Kim et al. | | |
| 9,444,031 | B2 * | 9/2016 | Park | ........................ | H02N 2/18 |
| 9,790,928 | B2 * | 10/2017 | Wang | ...................... | G01L 1/005 |
| 9,876,443 | B2 * | 1/2018 | Bae | ............................ | H02N 1/04 |
| 9,906,170 | B2 * | 2/2018 | Choi | ........................ | H02N 1/04 |
| 10,468,996 | B2 * | 11/2019 | Park | ........................ | H01B 1/20 |
| 2017/0218167 | A1 * | 8/2017 | Majidi | ..................... | C08K 3/08 |
| 2020/0304041 | A1 * | 9/2020 | Hu | ............................ | H02N 1/04 |
| 2020/0362218 | A1 * | 11/2020 | Kazem | ..................... | B22F 9/06 |

OTHER PUBLICATIONS

B.Blaiszik et al. "Autonomic Restoration of Electrical Conductivity" Advanced Materials 2012, v.24, pp. 398-401, 2012 (Year: 2012).*
Fan et al. "Flexible Triboelectric Generator!" Nano Energy 1(2) pp. 328-334 Mar. 2012. (Year: 2012).*
Jeong et al. "Mechanically Stretchable and Electrically Insulating Thermal Elastomer Composite by Liquid Alloy Droplet Embedment" Sci Rep. Dec. 16, 2015;5:18257. doi: 10.1038/srep18257. PMID: 26671673; PMCID: PMC4680911. (Year: 2015).*
Fassler et a;. "Liquid-Phase Metal Inclusions for a Conductive Polymer Composite" Advanced Materials 2015, DOI:10.1002/adma. 201405256. (Year: 2015).*

(Continued)

*Primary Examiner* — Burton S Mullins
(74) *Attorney, Agent, or Firm* — Purdue Research Foundation; Zhigang Rao

(57) ABSTRACT

The present disclosure relates to novel triboelectric nanogenerators with flexible polymeric dielectric layer comprising liquid metal particles, and method of making and using the novel triboelectric nanogenerators.

18 Claims, 6 Drawing Sheets

(56) References Cited

OTHER PUBLICATIONS

Bartlett et al. "Stretchable, High-k Dielectric Elastomers through Liquid-Metal Inclusions" Adv Mater. May 2016;28(19):3726-31. doi: 10.1002/adma.201506243. Epub Mar. 23, 2016. PMID: 27007888. (Year: 2016).*

M.A.H. Khondoker et al. "Fabrication methods and applications of microstructured gallium based liquid metal alloys" Smart Mater. Struct.25 (2016) 093001 (23pp) (Year: 2016).*

K. Jawed et al. "Soft-matter electronics and multifunctional materials with polydisperse liquid metal suspensions" Material architecture, principles, and applications to programmable matter, 2017 IEEE International Symposium on Antennas and Propagation 2017, pp. 417-418. (Year: 2017).*

Kazem et al. "Soft Multifunctional Composites and Emulsions with Liquid Metals" Advanced Materials, 2017, V.29, 1605985, pp. 1-14. (Year: 2017).*

Mallineni et al. "Facile and robust triboelectric nanogenerators assembled using off-the-shelf materials" Nano Energy 35 (2017), pp. 263-270 (Year: 2017).*

Koh et al. "Deformable liquid metal polymer composites with tunable electronic and mechanical properties" J.Mater.Res., vol. 33, No. 17, Sep. 14, 2018. (Year: 2018).*

S.Wang et al "A liquid metal-based triboelectric nanogenerator as stretchable electronics for safeguarding and self-powered mechanosensing" Nano Energy 53 (2018) 863-870 (Year: 2018).*

Q.Ye et al. "Effects of liquid metal particles on performance of triboelectric nanogenerator with electrospun polyacrylonitrile fiber films" Nano Energy 61 (2019) pp. 381-388. (Year: 2019).*

Tutika et al. "Liquid Metal-Elastomer Soft Composites with Independently Controllable and Highly Tunable Droplet Size and Volume Loading" Appl.Materi & Interfaces 2019, 11, 17873-17883 (Year: 2019).*

Yang, Y., Liquid-Metal-Based Super-Stretchable and Structure-Designable Triboelectric Nanogenerator for Wearable Electronics Polymers, ACS Nano 2018, 12, 2027-2034.

Zhang, B., Self-Powered Acceleration Sensor Based on Liquid Metal Triboelectric Nanogenerator for Vibration Monitoring, ACS Nano 2017, 11, 7440-7446.

* cited by examiner

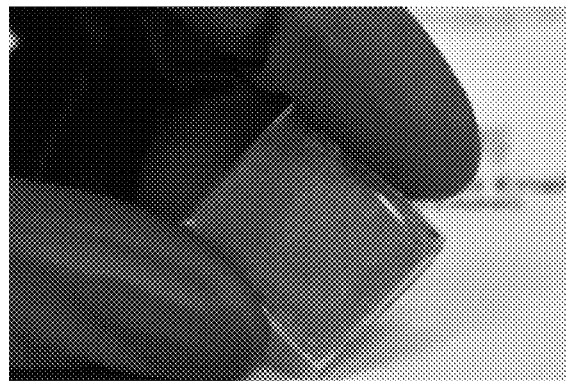
FIG. 1A
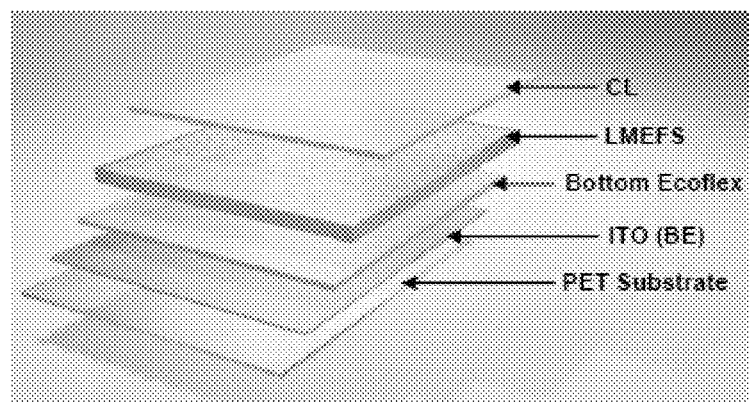
FIG. 1B
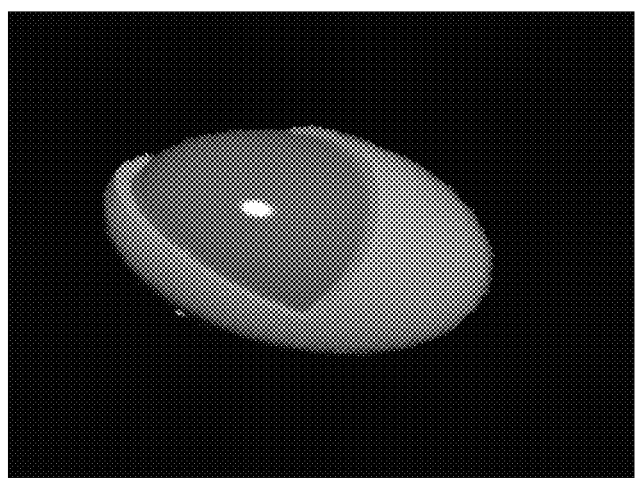
FIG. 1C
FIG. 1

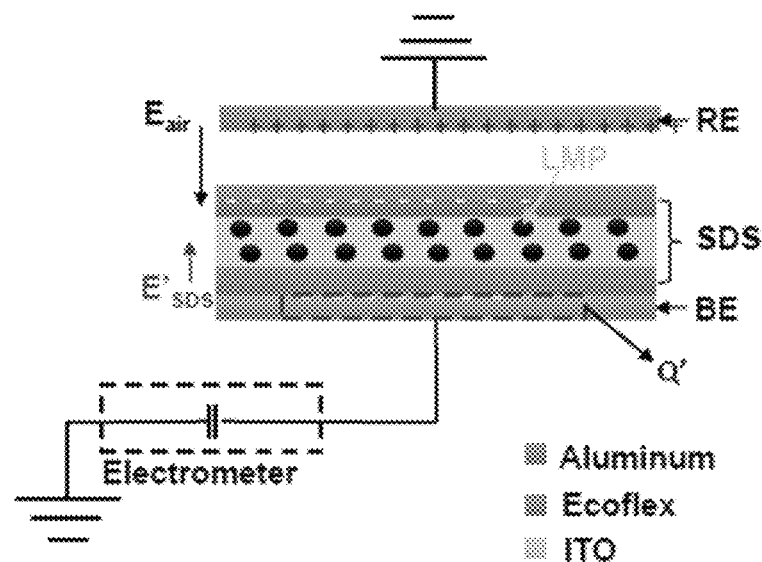
FIG. 3A
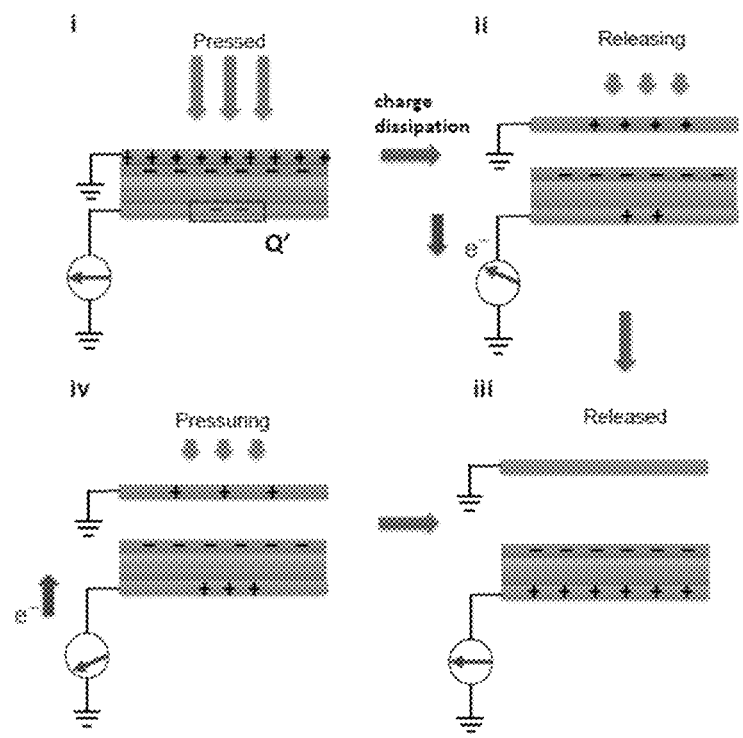
FIG. 3B
FIG. 3

TRIBOELECTRIC NANOGENERATORS

CROSS-REFERENCE TO RELATED APPLICATION

This application claims the benefits of U.S. Provisional Application Ser. No. 62/771,190, filed Nov. 26, 2018, the contents of which are incorporated herein entirely.

GOVERNMENT RIGHTS

This invention was made with government support under CNS-1726865 awarded by the National Science Foundation. The United States government has certain rights in the invention.

TECHNICAL FIELD

The present disclosure relates to novel triboelectric nanogenerators with flexible polymeric dielectric layer comprising liquid metal particles, and method of making and using the novel triboelectric nanogenerators.

BACKGROUND

This section introduces aspects that may help facilitate a better understanding of the disclosure. Accordingly, these statements are to be read in this light and are not to be understood as admissions about what is or is not prior art.

The capability of functional devices to scavenge the environmental energy through sustainable pathways is expected to enable exciting opportunities in self-powered micro-/nano-systems for emerging technologies, e.g., pervasive computing, advanced healthcare, human-machine interface, robotics, and the internet of things (IoT). An assortment of technologies has been developed to transform the otherwise wasted ambient mechanical energy into electrical power through mechanisms such as electrostatic, piezoelectric, and recently, triboelectric processes. Triboelectric nanogenerators (TENG) can efficiently harvest the ubiquitous mechanical energy for powering electronics and sensors, hinged on principles of triboelectrification and electrostatic induction. Ongoing TENG efforts primarily focus on augmenting power generation by increasing surface area, engineering the physical/chemical properties of contacting surfaces and implementing practical applications. Among these efforts, increasing the surface charge density through engineering the charge-trapping capabilities of the dielectric layers has been shown effective in boosting the TENG performance. Previous reports on such dielectric engineering suggest that the charge trapping ability of the contact layer (CL) in TENG increases with the increased dielectric constant of the polymer layer, leading to improved TENG performance. Nevertheless, the secondary-phase additive materials used for dielectric engineering in the state-of-the-art TENGs are exclusively solid type with limited deformability. The inherently rigid nature of these materials results in a severe compliance mismatch with the soft elastomer and issues such as undesirable stress concentrations and layer delamination, leading to deteriorated bulk deformability and long-term durability for wearable and stretchable applications. Moreover, recent studies suggest the saturation of surface charge density in the CL could significantly limit TENG's performance. Under such a condition, the widely adopted electrostatic models fail to provide a fair evaluation of TENG performance as well as guidance for robust and optimal design.

Hence, the development of new device/method to address the issues are needed in order to effectively fill the gaps.

SUMMARY

The present disclosure relates to novel triboelectric nanogenerators with flexible polymeric dielectric layer comprising liquid metal particles, and method of making and using the novel triboelectric nanogenerators.

In one embodiment, the present disclosure provides a triboelectric nanogenerator (TENG) comprising:
a flexible polymeric dielectric layer comprising liquid metal particles and a polymer,
wherein the liquid metal particles are dispersed within the polymer;
a first electrode; and
a second electrode,
wherein the second electrode is spaced apart from the first electrode with the flexible polymeric dielectric layer disposed between the first electrode and the second electrode.

In one embodiment, the present disclosure provides methods of making and using the novel triboelectric nanogenerators with flexible polymeric dielectric layer comprising liquid metal particles.

BRIEF DESCRIPTION OF THE DRAWINGS

FIG. 1, which comprises FIG. 1A, FIG. 1B, and FIG. 1C, shows the design of liquid-metal-inclusion based triboelectric nanogenerator (LMI-TENG). FIG. 1A shows an optical image of LMI-TENG. FIG. 1B shows the 3D illustration of LMI-TENG structure. FIG. 1C shows the microstructure of a liquid metal particle (LMP).

FIG. 3, which comprises FIG. 3A and FIG. 3B, shows working mechanism of LMI-TENG.

DETAILED DESCRIPTION

Figure 2:
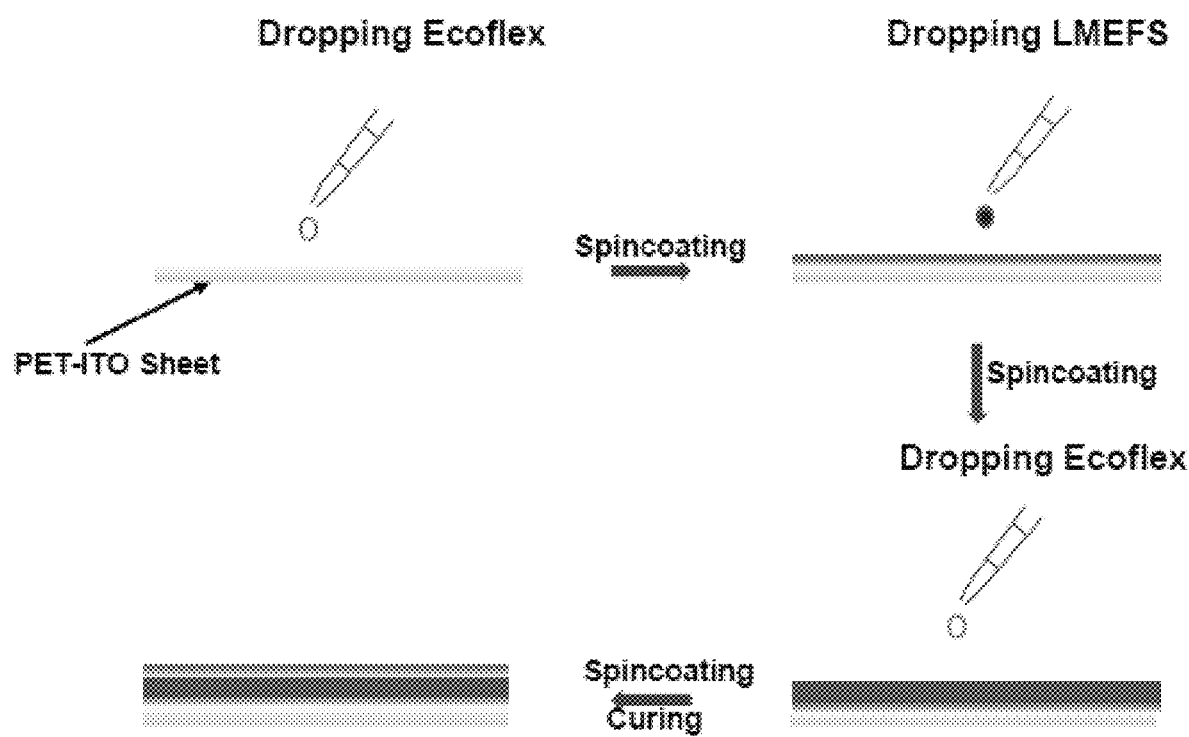
FIG. 2 shows the fabrication of LMI-TENG with ITO electrode.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "flexible substrate" may refer to any kind of organic or inorganic based flexible material such as any thermoplastic polymer, plastic material.

In the present disclosure the term "polymer" may refer to any kind of thermoplastic polymer that can provide desirable flexibility and strechability. Non limiting example including silicone materials.

To address these fundamental gaps and technological issues, the present disclosure provides the design and implementation of a liquid-metal-inclusion based TENG (LMI-TENG) with desirable deformability and optimized performance. The incorporation of the deformable core-shell liquid metal/native oxide inclusions in TENG's silicone layers enables the synergistic engineering of the surface charge density at the material level, of the dielectric environment at the structure level, and of the boosted output power with desired deformability at the device level. Through a holistic integration of modeling and experiments, this disclosure demonstrates that the output performance of LMI-TENG can be enhanced by 250% when 50 wt % LMI are incorporated with a desired constant surface charge density for the CL. The present disclosure further reveals the role of the surface leakage charge, a factor ignored by previous TENG studies, on the electrostatic process in LMI-TENG. With these new fundamental understandings, the present disclosure provides a proof-of-concept demonstration of the LMI-TENG based wireless media control system for potential human-integrated applications, e.g., self-powered user interface.

The Device Structure of LMI-TENG

FIG. 1A and FIG. 1B show the optical image and 3D schematics of an LMI-TENG, respectively. FIG. 3A and FIG. 3B, shows working mechanism of LMI-TENG. The LMI-TENG comprises a layer of liquid metal embedded functional silicone (LMEFS) sandwiched by two Ecoflex layers (thickness of each layer ~100 μm). The LMI-TENG example has an indium tin oxide (ITO) back electrode (BE, FIG. 3A) and a grounded aluminum reference electrode (RE). LMEFS layer is prepared by mixing different weight fractions (wt %) of Galinstan (an eutectic alloy with the composition ratio of Ga:68.5%, In:21.5%, and Tin:10%) liquid metal particles (LMPs, FIG. 1C) with the Ecoflex silicone through a mechanical stirring process (FIG. 2). Galinstan has a native oxide skin (~1-3 nm thick) which conformably covers each liquid metal particle once being exposed to the air (FIG. 1C). The core-shell liquid metal/native oxide structures facilitate the homogeneous dispersion of LMPs and eliminate the formation of a continuous conductive path among LMPs in the LMEFS. The two additional Ecoflex layers (FIG. 1B) ensure a constant surface charge density on the CL for LMI-TENGs with different wt % LMPs under the same mechanical inputs. This unique design in LMI-TENG, different from previous TENGs where the CL's surface charge density changes with the various dielectric constants, is critical for avoiding the potential interference from the different surface charge densities due to the different LMP wt %, and helping develop a new fundamental understanding of the performance enhancement in LMI-TENG through synergistically engineering both the dielectric property and the surface charge density. The post-processed images indicate that the shapes of the LMPs are about ellipsoidal, with the primary radii ranging from 15 μm to 200 μm. The spatial distribution of LMPs within the LMEFS is visualized by the 3D micro-computed tomography (Micro-CT) images of the sandwiched dielectric stacks (SDS), showing a substantially homogeneous dispersion of LMPs without forming a conductive percolation network, which is further confirmed by the dielectric measurement. If a percolation network exists, the dielectric constant of the SDS should decrease significantly, which is contrary to the result obtained, which showed a steady increase of the dielectric constant from about 4.58 to about 12.65 when wt. % of the liquid metal increased from 0% to about 50%.

Characterization of LMI-TENG's Performance

The open-circuit voltage ($V_{oc}$), short-circuit current density ($J_{sc}$) and short-circuit transferred charge density ($\sigma_{sc}$) were characterized when different wt % LMP is mixed into the LMEFS. The result shows that a 250% enhancement can be achieved in $V_{oc}$ when the LMP concentration is increased from 0 wt % to 50 wt %. A similar enhancement is also observed for $J_{sc}$ and $\sigma_{sc}$. When the concentration of LMP is further increased (e.g., from 50 wt % to 70 wt %), the output performance starts to degrade, though the absolute values of $V_{oc}$, $J_{sc}$, and $\sigma_{sc}$ are still more than twice larger than those obtained for the pristine TENGs. The output power of 50 wt % LMI-TENG reaches 13.95 mW/m$^2$, suggesting its potential to meet the power requirement for driving the operation of IoT devices. The ideal cycles of maximized energy output (CMEO) is considered as a standard method to characterize the ideal maximum output performance of TENG. The LMI-TENG with different LMP wt % showed that LMI-TENG can deliver a maximum output energy density of 1.33 mJ/m$^2$ per cycle. Dielectric measurements for different SDSs ($\varepsilon_{SDS}$) are consistent with the electrical characterization result. When the LMP wt % increases from 0 wt % to 50 wt %, $\varepsilon_{SDS}$ increases from 4.58 to 12.65, and starts to drop when the LMP wt % further increases to 70 wt %. The constant surface charge density for LMI-TENGs with different LMP wt % is confirmed by the Kelvin Probe Force Microscope (KPFM) characterization. For each device, the surface potentials for both the aluminum electrode and the CL are measured showed no significant difference in the surface potential for CLs from different LMI-TENGs, indicating that the densities of surface charges on each CL remain constant.

Dielectric Engineering and Analysis of SDS

To better understand the relationship between the LMP wt % and the dielectric constant of SDS for revealing the operation mechanism of LMI-TENG, the percolation theory was applied to quantitatively analyze the dependence of $\sigma_{SDS}$ on the LMP wt %. Given that the SDS can be considered as a binary-phase system, where Ecoflex silicone is the matrix material and LMPs are the secondary-phase additives, the effect of LMP concentration on such a composite system's general properties can be expressed as, $$\text{Properties} \propto (f_c - f_i)^{-s'} \quad (5)$$

where $f_i$ is the relative fraction of the secondary phase, $f_c$ is the percolation threshold related to the disappearance of the long-range, global connectivity of the second phase in the matrix, and s' is the critical exponent used to characterize the percolation transition. When considering the dielectric property, this relationship can be adapted into, $$\varepsilon = \varepsilon_0 \left[\frac{f_c - f}{f_c}\right]^{-s'} \quad (6)$$

fitting using equation (6), with the fitted values of $f_c$ for LMEFS is 0.7 and the corresponding s' is 0.865. The derived value for s' falls within the reasonable range (0.8~1) for a binary system. Therefore, according to the definition of the percolation threshold, $\varepsilon_{SDS}$ should reach the maximum when the LMP wt % is 70%. This is, however, contradictory to the experimental results that indicated an actual percolation threshold value at ~50%. Such a discrepancy can be understood as follows.

It is known that the dielectric constant of a binary system is closely related to the geometrical factor and the spatial distribution of the second-phase additives. The selected area particle analysis was run on LMEFS, and the statistical result suggested a positive correlation between the LMP wt % and the percentage of the projected area occupied by LMPs inside the silicone matrix. However, when the LMP concentration increases from 50% to 70%, there is no significant change on the percentage of the projected occupied area, indicating that the spatial distribution of LMPs should not be the main factor affecting the dielectric property of the SDS. Furthermore, $\varepsilon_{SDS}$ shows a frequency-independent characteristic, suggesting that the microcapacitor-structure model (MSM) widely adopted for the near-percolation-threshold dielectric constant could be applied to understand the effect of LMPs' geometrical factor on $\varepsilon_{SDS}$. Within a certain range, the increased wt % of LMP leads to the dispersion of more LMPs and a decreasing distance between adjacent LMPs. According to the MSM theory, such changes lead to a higher $\varepsilon_r$. When the LMP concentration reaches 70 wt %, the amount of LMPs is expected to continue increasing, and the distance between the adjacent LMPs should decrease further. However, the centrifugal force induced in the fabrication and by the mechanical pressing from CE during the contact-separate process is likely to lead to the fusion of smaller LMPs into larger LMPs. This is confirmed that the number of LMPs decreases by 40% while the LMP concentration increases from 50 wt % to 70 wt %. Moreover, the statistical result of the primary radius distribution for different LMEFS suggested that LMPs with larger primary radius (>250 μm) only appear in LMEFS with 70 wt % LMP. Thus, even though the distance between the adjacent LMPs does not vary significantly, the reduced amount of LMPS inside the Ecoflex matrix leads to a smaller $\varepsilon_{SDS}$. Finally, the measured dissipation factor (D), which evaluates the dielectric material's capability to store charge, for SDS (50 wt % LMP) is smaller than that for the pristine Ecoflex matrix in the low-frequency range, similar to the previous reports. This is in sharp contrast to the other known high-k polymers, which generally show an increased dissipation factor when the dielectric constant increases. This result suggests that LMEFS could be a promising candidate for future applications when both high-k and low dissipation factor are needed.

The Operation Mechanism of LMI-TENG and the Role of Surface Leakage Charge

To bridge the gap between the KPFM data and TENG output performance, the electrostatic induction within the SDS and BE was further studied. The effect of this electrostatic induction on the TENG performance has been ignored in previous studies under the ideal open circuit condition. The general expression for the TENG output voltage is:

$$V = \frac{\sigma x(t)}{\varepsilon_0} - \frac{Q}{S\varepsilon_0}\left(x(t) + \frac{d_{SDS}}{\varepsilon_{SDS}}\right) \quad (1)$$

where σ is the triboelectric charge density on the top of CL, Q is the number of transferred charges between BE and RE, $d_{SDS}$ and $\varepsilon_{SDS}$ represent the thickness and dielectric constant of SDS, respectively. S is the contact area, x(t) is the time-dependent gap distance between the top surface of CL and RE, and $\varepsilon_0$ is the vacuum dielectric constant. Previous models assume that there is no charge transfer between BE and RE (Q=0) under open-circuit condition, and the ideal $V_{oc}$ is hence given by:

$$V_{oc} = \frac{\sigma x(t)}{\varepsilon_0} \quad (2)$$

This leads to a trivial electrical field inside the SDS and the widely-accepted understanding that the effective way to boost $V_{oc}$ is to increase the surface charge density through approaches such as modulating the surface roughness of the CL, increasing the dielectric constant of SDS and etc. However, in reality, TENG has a finite dimension, and the electrical field originating from RE will not terminate at the air-CL interface as assumed in the previous models. Therefore, there should be negative induction charges accumulated in BE due to the penetration of the electrical field ($E_{air}$) through SDS, where $E_{air}$ is between RE and the top surface of SDS. This gives rise to the formation of a nontrivial electrical field ($E'_{SDS}$) which has the opposite direction to $E_{air}$ (FIG. 3a). As a result, the hypothetical condition Q=0 is not satisfied, suggesting that a more practical model considering the electrostatic induction in the dielectric layer should be adopted. Here, the present disclosure presents an analysis for the proposed model considering the LMEFS-dependent non-trivial electrical field within the SDS ($E'_{SDS}$). The modified effective electrical field (E'), which determines $V_{oc}$ in the TENG under the open-circuit condition should therefore be:

$$E' = \frac{1}{S \cdot \varepsilon_0}\left(\sigma S - \frac{Q'}{\varepsilon_{SDS}}\right) \quad (3)$$

where Q' is the induced charge in BE (FIG. 3a) by the propagating $E_{air}$ through the SDS. Consequently, Q' can be considered as the "surface leakage charge" during the TENG operation.

According to equation (3), if the dielectric constant of SDS ($\varepsilon_{SDS}$) increases, E' will also increase, leading to a boosted $V_{oc}$. If $\varepsilon_{SDS}$ is infinite, E' will be equal to $\sigma/\varepsilon_0$, same to the case for the infinitely large parallel plate capacitor, which is the fundamental model in the previous work. Finite Element Analysis (FEA) was carried out to further verify the correlation between the dielectric constant of SDS and $E'_{SDS}$. It was found that $E'_{SDS}$ decreases when $\varepsilon_{SDS}$ increases, leading to an increased E'. Consequently, the modified expression for the true open-circuit voltage of TENG should be:

$$V_{oc,true} = \frac{\sigma x(t)}{\varepsilon_0} - \frac{Q'}{S\varepsilon_0}\left(x(t) + \frac{d_{SDS}}{\varepsilon_{SDS}}\right) \quad (4)$$

If the amount of the total transferred charges without Q' is $Q_{tr}$, the real transferred charges should be $Q_{tr}$-Q'. Therefore, the output power, which is closely related to the amount of transferred charges between the two electrodes, will decrease accordingly. It should be noted that the magnitude of Q' depends on many factors. In the experiment of the present disclosure, however, $\varepsilon_{SDS}$ is the main contributor since other factors such as the thickness of SDS is controlled through the device fabrication. With the increased $\varepsilon_{SDS}$, $E'_{SDS}$ will be largely confined within the SDS, which decreases Q' and results in a higher $I_{sc}$ and $Q_{sc}$. Since the existence of Q' can significantly affect the TENG performance, more efforts are warranted for a comprehensive evaluation of Q' in the future work.

The working mechanism for LMI-TENG is illustrated in FIG. 3b. When the aluminum electrode contacts the CL of SDS, electrons tend to be transferred from the aluminum RE to the CL, leaving aluminum positively charged while the top surface of CL negatively charged (FIG. 3b-i). Once the two surfaces separate from each other, an electrical field will be established due to the separation of positive and negative charges, driving the flow of electrons from the ITO BE to the ground (FIG. 3b-ii). In the meantime, due to the existence of leakage charge insides the BE induced from imperfect screening, it will damp the electron transfer and thus affect the $V_{oc}$ (FIG. 3i-FIG. 3b-ii). With the increased distance between the aluminum and the CL, the resultant open-circuit voltage ($V_{oc}$), short-circuit current density ($J_{sc}$), and density of transferred charge between the two electrodes ($\sigma_{sc}$) all increase monotonically until a maximum gap distance is reached (FIG. 3b-iii). Subsequently, when the aluminum electrode moves towards the CL, the established electrical field within the LMI-TENG will decrease (FIG. 3b-iv), resulting in the flow of electrons back to the BE to reach an electrostatic equilibrium.

Prototypical Demonstration of a Self-powered User Interface

Figure 4:
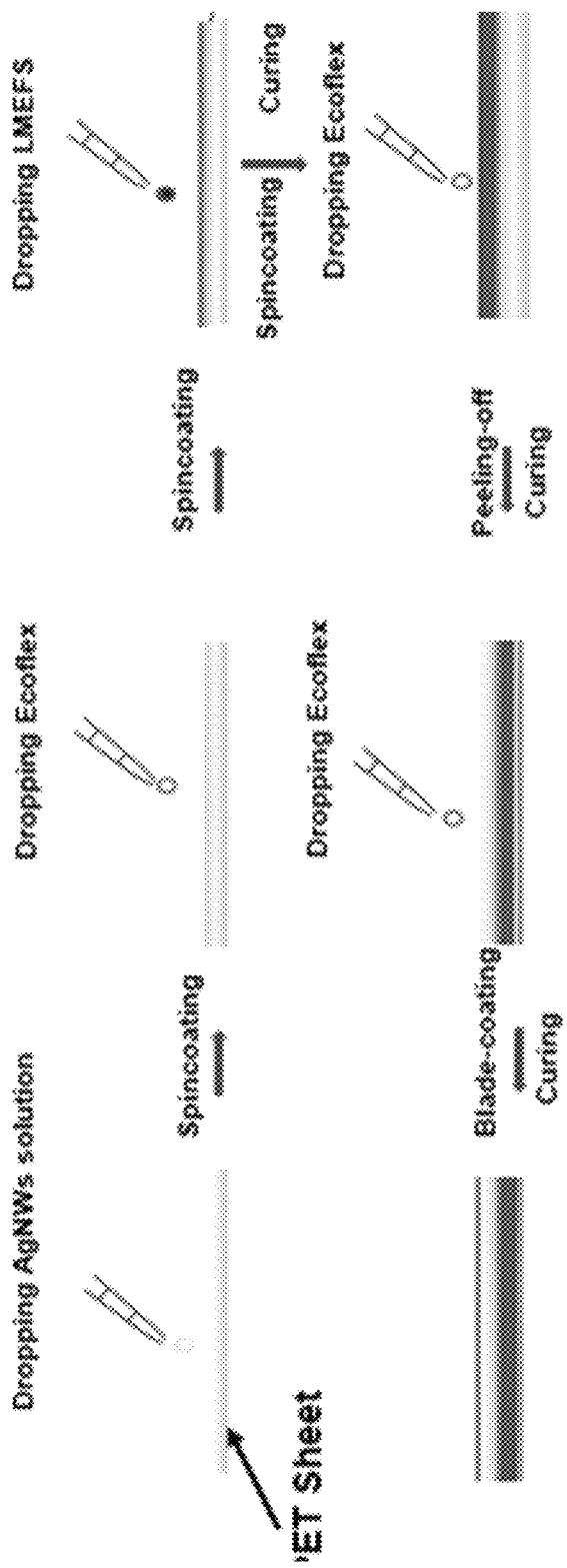
FIG. 4 shows the fabrication of LMI-TENG with sliver-nanowire (AgNW) electrode.
Figure 5:
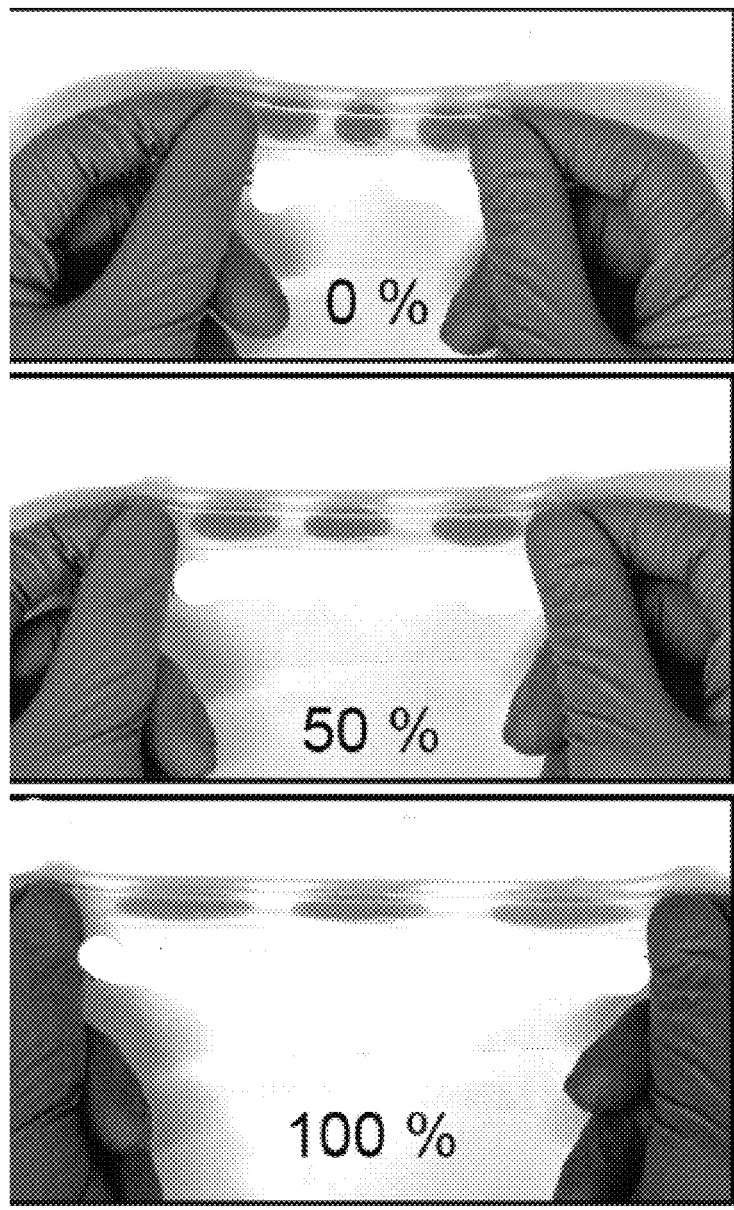
FIG. 5 shows stretchability of LIM-TENG with AgNW electrode.

A stretchable LMI-TENG device with spray-coated silver nanowires (FIG. 4 and FIG. 5) as the BE was also designed. The incorporation of sliver-nanowire electrodes significantly improves the mechanical stretchability and stability of the LMI-TENG, with no significant degradation in both the electrode conductivity and device output performance after 4500-cylce of stretch-release test. Compared to LMI-TENG devices with 0 wt % LMP, the output performance of LMI-TENG with 50 wt % LMP is boosted with an enhancement of 300%, consistent with the results when ITO electrodes are used. More significantly, the stretchable LMI-TENG shows great potential to efficiently harvest mechanical energy at a low frequency (e.g., 0.8 Hz), which is important for human-related applications and harvesting larger-scale mechanical energy, e.g., ocean wave.

Figure 6:
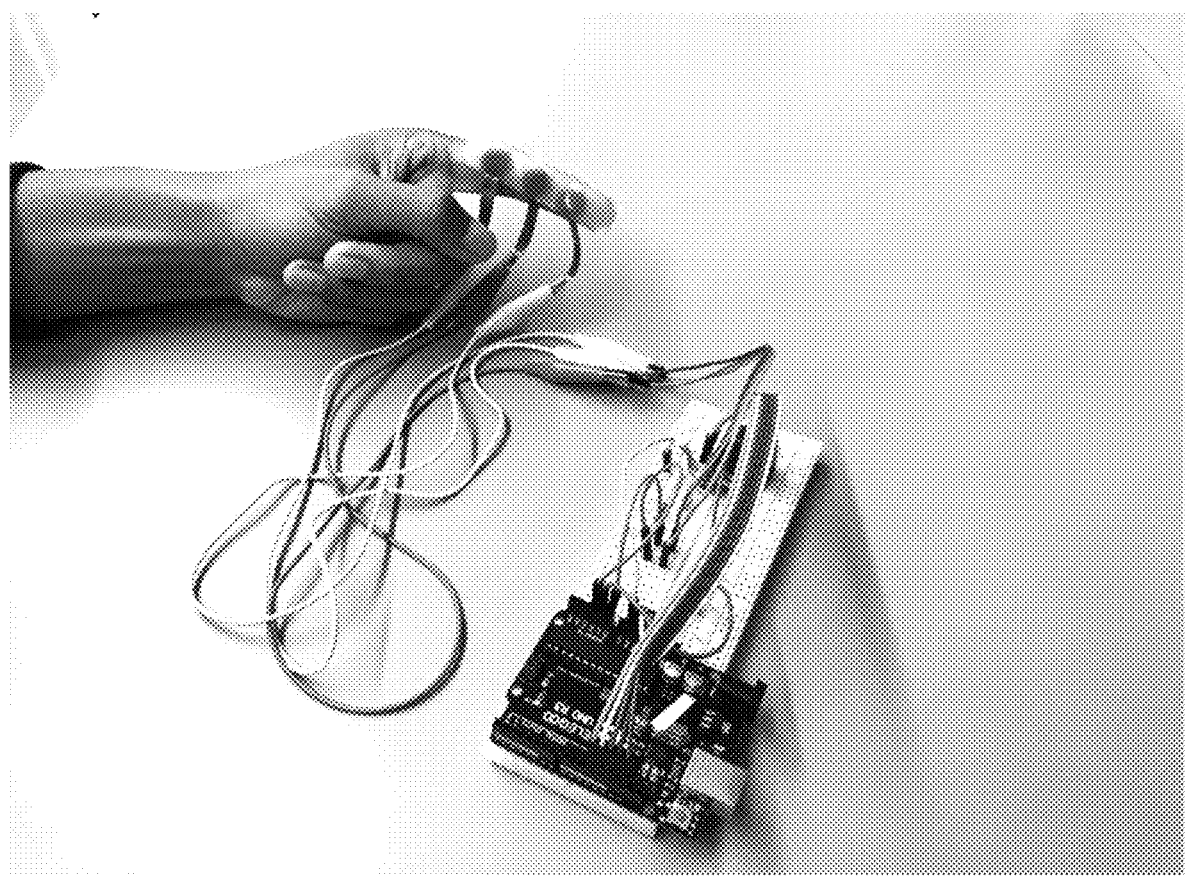
FIG. 6 shows an optical image of a wearable LMI-TENG unit in a media control system (MCS).

The feasibility of the wearable LMI-TENG of the present disclosure for potential application in human-integrated technology, e.g., user interface, has also been explored. A stretchable LMI-TENG based wireless media control system (MCS) was studied (FIG. 6). The device can adhere to the human skin conformably without using a tape. The high stretchability of Ecoflex silicone and sliver-nanowire BE ensures that the device of the present disclosure can withstand various types of deformation caused by the finger/skin motion during the daily operation. The LMI-TENG possesses a good sensitivity in the low-pressure region, promising for human motion detection. The prototypical device of the present disclosure comprises three digitized LMI-TENG unit (#0, #1, #2), and the data acquisition interface is realized using a 10-bit analog-to-digital converter (ADC). The adoption of serial communication makes it convenient to monitor the working status of MCS. The LMI-TENG MCS of the present disclosure is capable of detecting and translating different finger motions into electrical signals with distinct patterns for wirelessly controlling a music app on a remote computer. The experimental results showed the electrical outputs from the three LMI-TENGs in MCS when the "Play/Pause" function is initiated by only touching the LMI-TNEG #0. It should be noticed that pin #1 and #2 can pick up electrical voltage signals simultaneously, which is likely due to the coupling interference between each channel in micro-controller unit (MCU). The setting of detection threshold ($V_{th}$) can address the issue of signal interference by utilizing different logic level in each pin. The MCS of the present disclosure is capable of detecting the finger motion by identifying the change of the logic level combination of each three pins in MCU. When the sequence of logic level is switched from "0,0,0" to "0,1,0" to "0,0,1", indicating that the finger is sliding from LMI-TENG #2 to #3, the system volume will be increased. When the sequence of logic level is switched from "0,0,0" to "0,0,1" to "0,1,0", the MCS will decrease the system volume. The system of the present disclosure provides a controllable as well as a versatile platform for flexible LMI-TENG based wearable device and shows great potential in various areas including human-machine interface, remote operation, and smart artificial skin.

In summary, the present disclosure presents a platform for exploring liquid-state TENG devices based on high-dielectric constant stretchable polymers which incorporate the deformable core-shell liquid metal/native oxide microdroplets. The innovative design decouples the dielectric engineering and the surface charge density engineering, independently optimizing both of them at the same time. Through a holistic integration of modeling and experiments, the present disclosure revealed the fundamental electrostatic process in the LMI-TENG and map the design parameters necessary for enabling high-performance TENGs with desirable mechanical deformability. The role of the surface leakage charge, a factor ignored by previous TENG studies, has been theoretically and experimentally investigated. Due to the unique structure design, the non-trivial electrical field within TENG's contact layer and its influence on the TENG's working performance are discussed, which enriches the theoretical framework of TENG and advances the fundamental understanding of TENG's operation. Given the inherent mechanical deformability of the core-shell liquid metal/native oxide microdroplets, the use of such liquid-state TENG technology presents a promising solution for powering conformal electronics in future self-powered technologies. The present disclosure therefore presents an important step towards the potential realization of liquid-state energy harvesting systems that offer new form factors and functionality.

In one embodiment, the present disclosure provides a triboelectric nanogenerator (TENG) comprising:

a flexible polymeric dielectric layer comprising liquid metal particles and a polymer, wherein the liquid metal particles are dispersed within the polymer;

a first electrode, wherein the flexible polymeric dielectric layer is disposed on the first electrode; and a second electrode, wherein the second electrode is spaced apart from the first electrode with the flexible polymeric dielectric layer disposed between the first electrode and the second electrode.

In one embodiment, the present disclosure provides a triboelectric nanogenerator (TENG), wherein the flexible polymeric dielectric layer comprises a first surface and an opposite second surface; the first electrode comprises a first surface and an opposite second surface; and the second electrode comprises a first surface and an opposite second surface, wherein the flexible polymeric dielectric layer is disposed on the first surface of the first electrode.

In one embodiment, the present disclosure provides a triboelectric nanogenerator (TEND), wherein the liquid metal particles are substantially homogeneously dispersed within the flexible polymeric dielectric layer. In one aspect, there is sufficient space/distance between each liquid metal particle to allow each liquid metal particle stay independently from other liquid metal particles within the polymer.

In one embodiment, the present disclosure provides a triboelectric nanogenerator (TEND), wherein the flexible polymeric dielectric layer is further provided a first contact layer and a second contact layer, wherein the first contact layer is attached to the first surface of the flexible polymeric dielectric layer, and the second contact layer is attached to the opposite second surface of the flexible polymeric dielectric layer.

In one embodiment, the present disclosure provides a triboelectric nanogenerator (TENG), wherein the first contact layer is disposed between the first surface of the flexible polymeric dielectric layer and the first surface of the first electrode.

In one embodiment, the present disclosure provides a triboelectric nanogenerator (TENG), wherein the opposite second surface of the first electrode is attached to a flexible substrate.

In one embodiment, the present disclosure provides a triboelectric nanogenerator (TENG), wherein the flexible substrate, the first electrode, the first contact layer, the flexible polymeric dielectric layer, and the second contact layer are joined together to form an integrated unit, wherein the integrated unit is capable of being spaced apart from the second electrode to form a triboelectric nanogenerator.

In one embodiment, the present disclosure provides a triboelectric nanogenerator (TENG),), wherein the flexible substrate, the first electrode, the first contact layer, the flexible polymeric dielectric layer, and the second contact layer are joined together to form an integrated unit, wherein the integrated unit is capable of being spaced apart from the second electrode to form a triboelectric nanogenerator, wherein the integrated unit is a flexible or stretchable unit.

In any previous embodiment, the present disclosure provides a triboelectric nanogenerator (TENG), wherein the polymer in the flexible polymeric dielectric layer comprises silicone, and/or wherein the first contact layer and the second contact layer comprise silicone.

In any previous embodiment, the present disclosure provides a triboelectric nanogenerator (TENG) wherein the first electrode and/or second electrode are flexible electrodes. In one aspect, the flexible electrode may be but is not limited to indium tin oxide based electrode, a metal nanowire based electrode, or a deposited metal electrode.

In any previous embodiment, the present disclosure provides a triboelectric nanogenerator (TENG), wherein the liquid metal particles are particles of a gallium-based alloy. In one aspect, the gallium-based alloy may be but is not limited to an alloy comprising gallium, indium, and tin.

In any previous embodiment, the present disclosure provides a triboelectric nanogenerator (TENG), wherein the total wt. % of the liquid metal particles in the flexible polymeric dielectric layer is about 5-70%, the total wt. % of the polymer in the flexible polymeric dielectric layer is about 30-95%.

In any previous embodiment, the present disclosure provides a triboelectric nanogenerator (TENG), wherein the liquid metal particles have an average radius of about 1-500 µm, 1-400 µm, 1-300 µm, 1-200 µm, 1-100 µm, 10-500 µm, 10-400 µm, 10-300 µm, 10-200 µm, 1-100 µm, 25-500 µm, 25-400 µm, 25-300 µm, 25-200 µm, or 25-100 µm. The particle size may be dependent on the mechanical stirring process and the weight fraction.

In one embodiment, the present disclosure provides an electrode device comprising a flexible substrate, a first electrode, a first contact layer, a flexible polymeric dielectric layer, and a second contact layer that are joined together to form an integrated unit, wherein the integrated unit is capable of being spaced apart from a second electrode to form a triboelectric nanogenerator: and wherein the flexible polymeric dielectric layer comprises liquid metal particles and a polymer, wherein the liquid metal particles are dispersed within the polymer.

In one embodiment, the present disclosure provides an electrode device, wherein the liquid metal particles comprise particles of a gallium-based alloy, the polymer comprises silicone, wherein the total wt. % of the liquid metal particles in the flexible polymeric dielectric layer is 5-70%, the total wt. % of the polymer in the flexible polymeric dielectric layer is 30-95%.

Those skilled in the art will recognize that numerous modifications can be made to the specific implementations described above. The implementations should not be limited to the particular limitations described. Other implementations may be possible.

We claim:

1. A triboelectric nanogenerator (TENG) comprising:
    a flexible polymeric dielectric layer comprising liquid metal particles and a polymer,
    wherein the liquid metal particles are dispersed within the polymer without forming a substantive conductive percolation network;
    a first electrode; and
    a second electrode,
    wherein the second electrode is spaced apart from the first electrode with the flexible polymeric dielectric layer disposed between the first electrode and the second electrode.

2. The triboelectric nanogenerator of claim 1, wherein
    the flexible polymeric dielectric layer comprises a first surface and an opposite second surface;
    the first electrode comprises a first surface and an opposite second surface; and
    the second electrode comprises a first surface and an opposite second surface,
    wherein the flexible polymeric dielectric layer is disposed on the first surface of the first electrode.

3. The triboelectric nanogenerator of claim 2, wherein the flexible polymeric dielectric layer is further provided a first contact layer and a second contact layer, wherein the first contact layer is attached to the first surface of the flexible polymeric dielectric layer, and the second contact layer is attached to the opposite second surface of the flexible polymeric dielectric layer.

4. The triboelectric nanogenerator of claim 3, wherein the first contact layer is disposed between the first surface of the flexible polymeric dielectric layer and the first surface of the first electrode.

5. The triboelectric nanogenerator of claim 3, wherein the first contact layer and the second contact layer comprise silicone.

6. The triboelectric nanogenerator of claim 1, wherein the liquid metal particles are substantially homogeneously dispersed within the flexible polymeric dielectric layer.

7. The triboelectric nanogenerator of claim 1, wherein the opposite second surface of the first electrode is attached to a flexible substrate.

8. The triboelectric nanogenerator of claim 7, wherein the flexible substrate, the first electrode, the first contact layer, the flexible polymeric dielectric layer, and the second contact layer are joined together to form an integrated unit, wherein the integrated unit is capable of being spaced apart from the second electrode to form a triboelectric nanogenerator.

9. The triboelectric nanogenerator of claim 8, wherein the integrated unit is a flexible and/or stretchable unit.

10. The triboelectric nanogenerator of claim 1, wherein the polymer in the flexible polymeric dielectric layer comprises silicone.

11. The triboelectric nanogenerator of claim 1, wherein the first electrode and/or second electrode are flexible electrodes.

12. The triboelectric nanogenerator of claim 11, wherein the first electrode is an indium tin oxide based electrode, a metal nanowire based electrode, or a deposited metal electrode.

13. The triboelectric nanogenerator of claim 1, wherein the second electrode is any electrode comprising electric conducting material.

14. The triboelectric nanogenerator of claim 1, wherein the liquid metal particles are particles comprising a gallium-based alloy.

15. The triboelectric nanogenerator of claim 1, wherein the liquid metal particles are particles comprising an alloy comprising gallium, indium, and tin.

16. The triboelectric nanogenerator of claim 1, wherein the total wt. % of the liquid metal particles in the flexible polymeric dielectric layer is 5-70%, the total wt. % of the polymer in the flexible polymeric dielectric layer is 30-95%.

17. An electrode device comprising a flexible substrate, a first electrode, a first contact layer, a flexible polymeric dielectric layer, and a second contact layer that are joined together to form an integrated unit,
wherein the integrated unit is capable of being spaced apart from a second electrode to form a triboelectric nanogenerator; and
wherein the flexible polymeric dielectric layer comprises liquid metal particles and a polymer, wherein the liquid metal particles are substantially homogeneously dispersed within the polymer without forming a substantive conductive percolation network.

18. The electrode device of claim 17, wherein the liquid metal particles comprise particles of a gallium-based alloy, the polymer comprises silicone, wherein the total wt. % of the liquid metal particles in the flexible polymeric dielectric layer is 5-70%, the total wt. % of the polymer in the flexible polymeric dielectric layer is 30-95%.

* * * * *